(12) United States Patent
Wakabayashi et al.

(10) Patent No.: US 9,986,193 B2
(45) Date of Patent: *May 29, 2018

(54) IMAGE PICKUP CIRCUIT, CMOS SENSOR, AND IMAGE PICKUP DEVICE

(71) Applicant: Sony Corporation, Tokyo (JP)

(72) Inventors: Hayato Wakabayashi, Tokyo (JP); Yoshiaki Inada, Tokyo (JP); Ken Koseki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/442,566

(22) Filed: Feb. 24, 2017

(65) Prior Publication Data

US 2017/0171487 A1 Jun. 15, 2017

Related U.S. Application Data

(63) Continuation of application No. 15/058,845, filed on Mar. 2, 2016, now Pat. No. 9,654,717, which is a
(Continued)

(30) Foreign Application Priority Data

May 17, 2007 (JP) ................................. 2007-132097
Jul. 6, 2007 (JP) ................................. 2007-178075

(51) Int. Cl.
| | |
|---|---|
| *H04N 5/378* | (2011.01) |
| *H04N 5/3745* | (2011.01) |
| *H04N 5/365* | (2011.01) |
| *H04N 5/357* | (2011.01) |
| *H04N 5/361* | (2011.01) |

(52) U.S. Cl.
CPC .......... *H04N 5/378* (2013.01); *H04N 5/3575* (2013.01); *H04N 5/361* (2013.01); *H04N 5/3655* (2013.01); *H04N 5/3658* (2013.01); *H04N 5/3745* (2013.01); *H04N 5/37455* (2013.01)

(58) Field of Classification Search
None
See application file for complete search history.

(56) References Cited

U.S. PATENT DOCUMENTS

| | | |
|---|---|---|
| 3,991,323 A | 11/1976 | Przybylski |
| 6,201,235 B1 | 3/2001 | Takeuchi et al. |
| (Continued) | | |

FOREIGN PATENT DOCUMENTS

| | | |
|---|---|---|
| JP | 2002-010121 | 1/2002 |
| JP | 2002-330348 | 11/2002 |
| JP | 2005-328135 | 11/2005 |

*Primary Examiner* — Roberto Velez
*Assistant Examiner* — Yih-Sien Kao
(74) *Attorney, Agent, or Firm* — Michael Best & Friedrich LLP

(57) ABSTRACT

Disclosed herein is an image pickup circuit including: amplifying means for amplifying a charge corresponding to an amount of light received by a photodetector, and outputting a pixel signal; ramp signal generating means for generating a ramp signal whose voltage drops with a fixed slope from a predetermined initial voltage; and comparing means for comparing the pixel signal output by the amplifying means with the ramp signal output by the ramp signal generating means. A reference potential of the pixel signal output by the amplifying means and a reference potential of the ramp signal output by the ramp signal generating means are at a same level.

18 Claims, 10 Drawing Sheets

Related U.S. Application Data continuation of application No. 14/150,233, filed on Jan. 8, 2014, now abandoned, which is a continuation of application No. 12/150,004, filed on Apr. 24, 2008, now Pat. No. 8,654,230.

(56) References Cited

U.S. PATENT DOCUMENTS

| | | |
|---|---|---|
| 6,914,631 B2 | 7/2005 | Udo et al. |
| 6,937,279 B1 | 8/2005 | Kim et al. |
| 6,963,373 B2 | 11/2005 | Imaizumi |
| 7,605,545 B2 | 10/2009 | Bai et al. |
| 2003/0231059 A1 | 12/2003 | Takemura |
| 2004/0246163 A1 | 12/2004 | Leung |
| 2005/0253942 A1 | 11/2005 | Muramatsu et al. |
| 2006/0170795 A1 | 8/2006 | Huguchi et al. |
| 2007/0146514 A1 | 6/2007 | Maeda et al. |

EXAMPLE OF IMAGE OF
LATERALLY DRAWN NOISE

F I G . 6
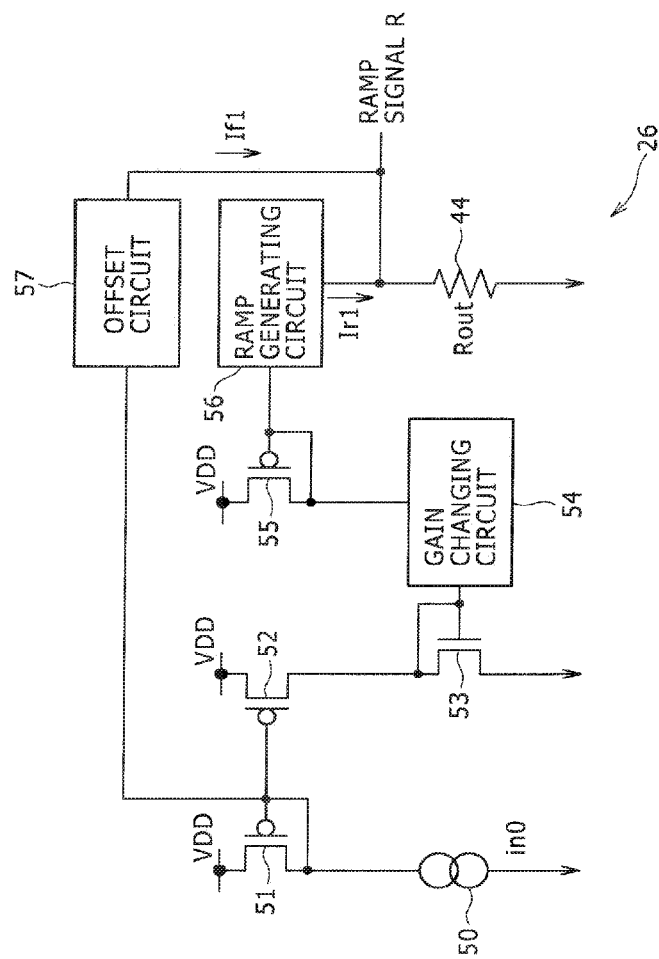

IMAGE PICKUP CIRCUIT, CMOS SENSOR, AND IMAGE PICKUP DEVICE

CROSS REFERENCES TO RELATED APPLICATIONS

The present application is a Continuation of U.S. application Ser. No. 15/058,845, filed Mar. 2, 2016, which is a Continuation of U.S. application Ser. No. 14/150,233, filed Jan. 8, 2014, now Abandoned, which is a Continuation of U.S. application Ser. No. 12/150,004, filed Apr. 24, 2008, now U.S. Pat. No. 8,654,230, issued Feb. 18, 2014, which claims priority to Japanese Patent Application JP 2007-132097, filed with the Japanese Patent Office on May 17, 2007, and Japanese Patent Application JP 2007-178075, filed with the Japanese Patent Office on Jul. 6, 2007, the entire contents of which being incorporated herein by reference.

BACKGROUND OF THE INVENTION

1. Field of the Invention

The present invention relates to an image pickup circuit, a CMOS sensor, and an image pickup device, and particularly to an image pickup circuit, a CMOS sensor, and an image pickup device that can reduce the noise of an image.

2. Description of the Related Art

In the past, a CMOS (Complementary Metal Oxide Semiconductor) sensor as a solid-state image pickup element has advantages such as lower power consumption, higher speed and the like over a CCD (Charge Coupled Device), for example, and has recently been widely a same level. incorporated into a portable telephone, a compact digital camera, a high-grade single-lens reflex camera, a camcorder, a monitoring camera, a guidance system and the like.

In addition, a high-performance sensor that outputs a high-quality image has recently been developed in which sensor functional circuit blocks such as an image processing circuit and the like are formed on a chip together with a CMOS sensor.

For example, Japanese Patent No. 3734717 or Japanese Patent No. 3710361 (referred to as Patent Document 1 or 2 hereinafter) discloses techniques in which using a CDS (Correlated Double Sampling) circuit to process an image signal in a CMOS sensor, a received light signal from a photodiode within a pixel is passed through an analog CDS circuit disposed in each pixel column to thereby remove noise included in the pixel signal, and thereafter A/D conversion is performed.

However, in a case of thus using the CDS circuits, there is for example a problem of occurrence of noise in a stripe-shaped fixed pattern due to variations of the CDS circuits in each pixel column, a problem of an increase in circuit area because it is necessary to provide a capacitive element for retaining a signal value after CDS processing, or a problem of susceptibility to switching noise or the like because rapid horizontal scanning of an analog signal is performed by a shift register.

Accordingly, for example, Japanese Patent Laid-Open No. 2005-328135 (referred to as Patent Document 3 hereinafter) proposes a solution to these problems by a parallel column A/D (Analog/Digital) conversion system (hereinafter referred to as a column AD system).

In the column AD system, an A/D converter is placed in each pixel column, and analog signals of respective pixels in selected columns are collectively output to respective vertical signal lines and are then directly subjected to A/D conversion. Therefore, the problems occurring when the CDS circuit as described above is used are solved, and high-precision noise removal can be performed.

Further, in the column AD system, because of parallel processing in each row in a horizontal direction of an image, scanning in the horizontal direction does not have to be driven at a high frequency, and A/D conversion can be driven at a low frequency in a vertical direction. The column AD system therefore has another advantage of being able to separate a noise component occurring in a high-frequency band from a signal component easily.

A configuration of a CMOS sensor employing the column AD system will be described in the following with reference to FIG. 1.

In FIG. 1, a CMOS sensor 11 includes an FD (Floating Diffusion) 12, a transistor 13, a current source 14, a reference voltage circuit 15, a resistance 16, N comparators 17.sub.1 to 17.sub.N, and N counters 18.sub.1 to 18.sub.N.

Incidentally, FIG. 1 shows one of pixels forming a pixel array in which the plurality of pixels detecting light are arranged in the form of a lattice, and does not show the other pixels. Of constituent elements of the one pixel, only the FD 12 and the transistor 13 for detecting a pixel signal are shown, while transistors necessary to read the pixel signal such as a transfer transistor, a reset transistor, a selection transistor and the like and a photodiode are not shown.

As shown in FIG. 1, one terminal of the FD 12 is grounded, and another terminal of the FD 12 is connected to the gate of the transistor 13. The source of the transistor 13 is connected to a power supply voltage VDD for driving. The drain of the transistor 13 is grounded via the current source 14, and is connected to one input terminal of the comparator 17.sub.1.

The output terminal of the reference voltage circuit 15 is connected to the power supply voltage VDD for driving via the resistance 16, and is connected to another input terminal of the comparator 17.sub.1. The output terminal of the comparator 17.sub.1 is connected to the counter 18.sub.1. As with the comparator 17.sub.1, the comparators 17.sub.2 to 17.sub.N have one input terminal connected to the drain of a transistor of a pixel not shown in the figure, have another input terminal connected to the output terminal of the reference voltage circuit 15, and have an output terminal connected to the counters 18.sub.2 to 18.sub.N, respectively.

A charge corresponding to an amount of light received by the photodiode not shown in the figure is transferred to the FD 12 to be accumulated in the FD 12. The transistor 13 amplifies the charge accumulated in the FD 12 and then supplies a pixel signal P to one input terminal of the comparator 17.sub.1. The other input terminal of the comparator 17.sub.1 is supplied with a ramp signal R output from the reference voltage circuit 15. Then, the comparator 17.sub.1 outputs a comparison signal indicating a result of comparing the pixel signal P and the ramp signal R with each other to the counter 18.sub.1. The counter 18.sub.1 counts a predetermined clock signal according to the comparison signal, and then outputs the count value as pixel data.

In the thus formed CMOS sensor 11, the FD 12 connected to the gate of the transistor 13 has a parasitic capacitance with GND, and the reference potential of the pixel signal P is a GND level, whereas the reference potential of the ramp signal R is the level of the power supply voltage VDD. Thus, for example, when a noise occurs in the power supply voltage VDD, the noise is superimposed on the ramp signal R, and effect of the noise appears in the result of comparing the pixel signal P and the ramp signal R with each other.

FIG. 2 shows an example of laterally drawn noise caused by such noise and occurring in an image. The laterally drawn noise appears as a randomly changing noise.

SUMMARY OF THE INVENTION

As described above, the noise of the power supply voltage results in a noise in an image.

The present invention has been made in view of such a situation. It is desirable to be able to reduce a noise in an image.

According to a first embodiment of the present invention, there is provided an image pickup circuit including: amplifying means for amplifying a charge corresponding to an amount of light received by a photodetector, and outputting a pixel signal; ramp signal generating means for generating a ramp signal whose voltage drops with a fixed slope from a predetermined initial voltage; and comparing means for comparing the pixel signal output by the amplifying means with the ramp signal output by the ramp signal generating means; wherein a reference potential of the pixel signal output by the amplifying means and a reference potential of the ramp signal output by the ramp signal generating means are at a same level.

According to a second embodiment of the present invention, there is provided a CMOS sensor formed by disposing an image pickup circuit on a semiconductor chip, wherein the image pickup circuit includes amplifying means for amplifying a charge corresponding to an amount of light received by a photodetector, and outputting a pixel signal, ramp signal generating means for generating a ramp signal whose voltage drops with a fixed slope from a predetermined initial voltage, and comparing means for comparing the pixel signal output by the amplifying means with the ramp signal output by the ramp signal generating means, and a reference potential of the pixel signal output by the amplifying means and a reference potential of the ramp signal output by the ramp signal generating means are at a same level.

According to a third embodiment of the present invention, there is provided an image pickup device having a CMOS sensor formed by disposing an image pickup circuit on a semiconductor chip, wherein the image pickup circuit includes amplifying means for amplifying a charge corresponding to an amount of light received by a photodetector, and outputting a pixel signal, ramp signal generating means for generating a ramp signal whose voltage drops with a fixed slope from a predetermined initial voltage, and comparing means for comparing the pixel signal output by the amplifying means with the ramp signal output by the ramp signal generating means, and a reference potential of the pixel signal output by the amplifying means and a reference potential of the ramp signal output by the ramp signal generating means are at a same level.

The first to third embodiments of the present invention amplify a charge corresponding to an amount of light received by a photodetector, output a pixel signal, generate a ramp signal whose voltage drops with a fixed slope from a predetermined initial voltage, and compare the pixel signal with the ramp signal. A reference potential of the pixel signal and a reference potential of the ramp signal are at a same level.

According to the first to third embodiments of the present invention, it is possible to reduce noise in an image.

BRIEF DESCRIPTION OF THE DRAWINGS

FIG. 6 is a circuit diagram showing an example of configuration of a reference voltage circuit;

DETAILED DESCRIPTION OF THE PREFERRED EMBODIMENTS

Figure 1:
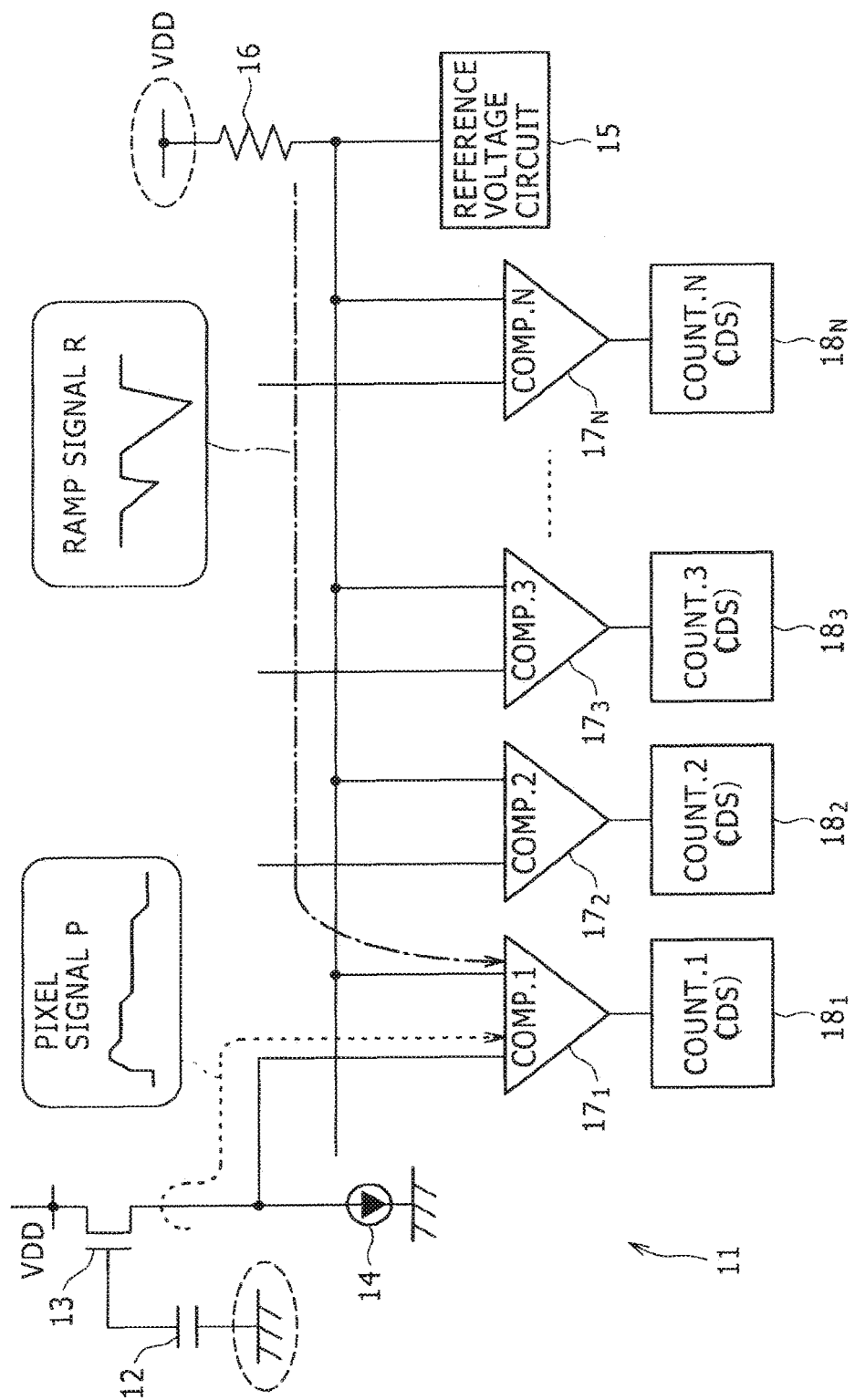
FIG. 1 is a circuit diagram showing a configuration of an example of a CMOS sensor in the past.

Preferred embodiments of the present invention will hereinafter be described. Correspondences between constitutional requirements of the present invention and embodiments described in the specification or the drawings are illustrated as follows. This description is to confirm that embodiments supporting the present invention are described in the specification or the drawings. Therefore, even when there is an embodiment described in the specification or drawings but not described here as an embodiment corresponding to a constitutional requirement of the present invention, it does not signify that the embodiment does not correspond to the constitutional requirement. Conversely, even when an embodiment is described here as corresponding to a constitutional requirement, it does not signify that the embodiment does not correspond to constitutional requirements other than that constitutional requirement.

An image pickup circuit according to a first embodiment of the present invention includes: amplifying means (for example a transistor 42 in FIG. 5) for amplifying a charge corresponding to an amount of light received by a photodetector, and outputting a pixel signal; ramp signal generating means (for example a reference voltage circuit 26 in FIG. 5) for generating a ramp signal whose voltage drops with a fixed slope from a predetermined initial voltage; and comparing means (for example comparators 31.sub.1 to 31.sub.N in FIG. 5) for comparing the pixel signal output by the amplifying means with the ramp signal output by the ramp signal generating means; wherein a reference potential of the pixel signal output by the amplifying means and a reference potential of the ramp signal output by the ramp signal generating means are at a same level.

In the image pickup circuit according to the first embodiment of the present invention, the ramp signal generating means can include gain changing means (for example a gain changing circuit 54 in FIG. 6) for changing a gain of an image picked up by the image pickup circuit by changing the slope of the ramp signal and a transistor (for example a transistor 53 in FIG. 6) forming a current mirror circuit together with the gain changing means, and when the gain is at a minimum, a ratio between conductance of the gain changing means and conductance of the transistor is for example one.

In the image pickup circuit according to the first embodiment of the present invention, the ramp signal is in a form having a first section in which the voltage of the ramp signal drops from a first initial voltage with a fixed slope and a second section in which the voltage of the ramp signal drops from a second initial voltage with a fixed slope, and the ramp signal generating means can further include normal ramp signal generating means (for example a ramp generating circuit 56 in FIG. 6) for generating the ramp signal whose first initial voltage and whose second initial voltage are equal to each other and offset means (for example an offset circuit 57 in FIG. 6) for superimposing an offset component for making the first initial voltage higher than the second initial voltage on the ramp signal at an offset time when the first initial voltage and the second initial voltage are offset from each other.

A CMOS sensor according to a second embodiment of the present invention is a CMOS sensor formed by disposing an image pickup circuit on a semiconductor chip, wherein the image pickup circuit includes amplifying means (for example a transistor 42 in FIG. 5) for amplifying a charge corresponding to an amount of light received by a photodetector, and outputting a pixel signal, ramp signal generating means (for example a reference voltage circuit 26 in FIG. 5) for generating a ramp signal whose voltage drops with a fixed slope from a predetermined initial voltage, and comparing means (for example comparators 31.sub.1 to 31.sub.N in FIG. 5) for comparing the pixel signal output by the amplifying means with the ramp signal output by the ramp signal generating means; wherein a reference potential of the pixel signal output by the amplifying means and a reference potential of the ramp signal output by the ramp signal generating means are at a same level.

An image pickup device according to a third embodiment of the present invention is an image pickup device having a CMOS sensor formed by disposing an image pickup circuit on a semiconductor chip, wherein the image pickup circuit includes amplifying means (for example a transistor 42 in FIG. 5) for amplifying a charge corresponding to an amount of light received by a photodetector, and outputting a pixel signal, ramp signal generating means (for example a reference voltage circuit 26 in FIG. 5) for generating a ramp signal whose voltage drops with a fixed slope from a predetermined initial voltage, and comparing means (for example comparators 31.sub.1 to 31.sub.N in FIG. 5) for comparing the pixel signal output by the amplifying means with the ramp signal output by the ramp signal generating means; wherein a reference potential of the pixel signal output by the amplifying means and a reference potential of the ramp signal output by the ramp signal generating means are at a same level.

Concrete embodiments to which the present invention is applied will hereinafter be described in detail with reference to the drawings.

Figure 3:
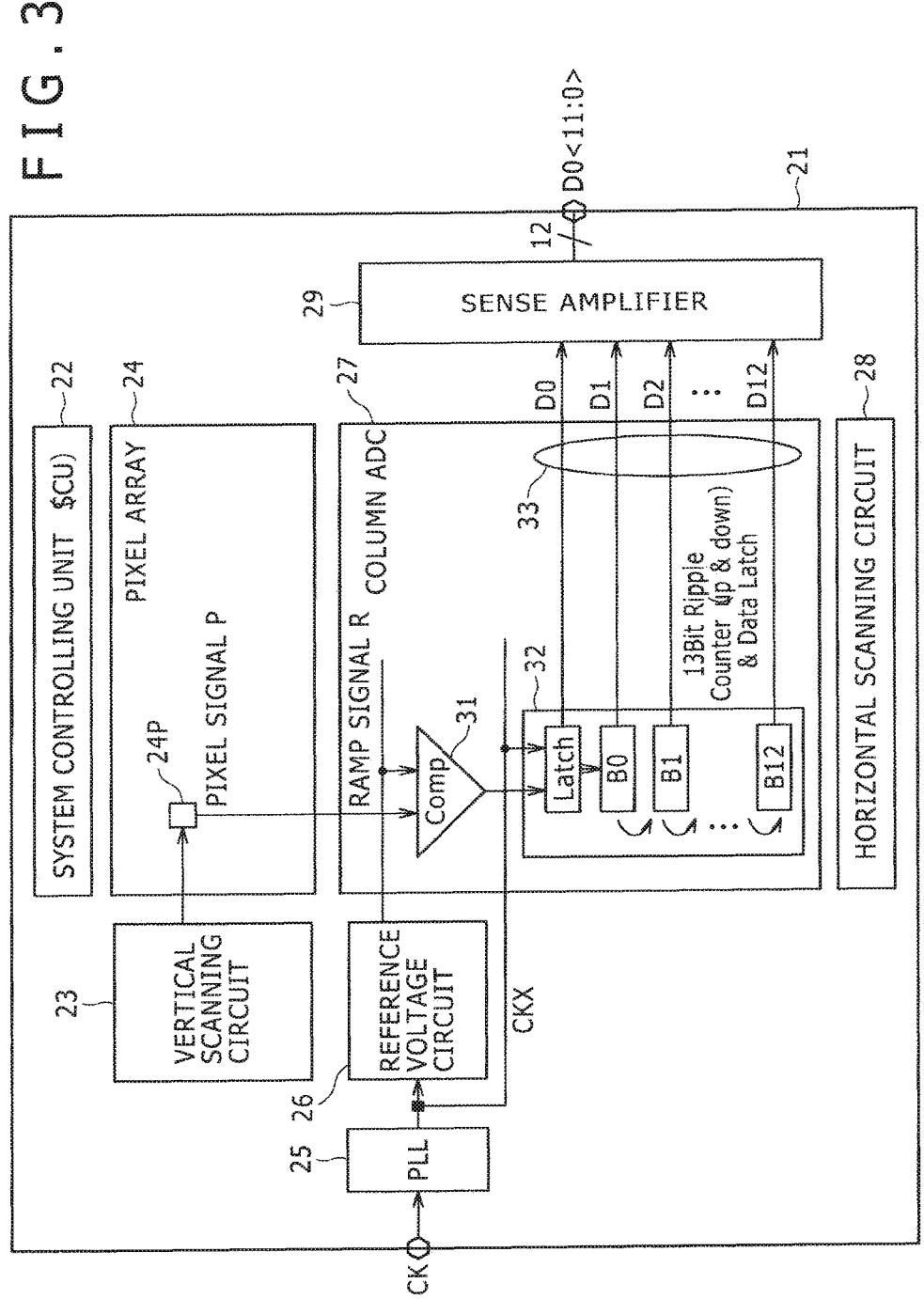
FIG. 3 is a block diagram showing an example of configuration of an embodiment of a CMOS sensor to which the present invention is applied.

FIG. 3 is a block diagram showing an example of configuration of an embodiment of a CMOS sensor to which the present invention is applied.

The CMOS sensor 21 in FIG. 3 includes a system controlling unit 22, a vertical scanning circuit 23, a pixel array 24, a PLL (Phase Locked Loop) 25, a reference voltage circuit 26, a column ADC (Analog to Digital Converter) 27, a horizontal scanning circuit 28, and a sense amplifier 29.

The system controlling unit 22 controls each of the blocks forming the CMOS sensor 21.

The vertical scanning circuit 23 sequentially supplies a signal for controlling output of a pixel signal to pixels arranged in a vertical direction of the pixel array 24 in predetermined timing according to control of the system controlling unit 22.

The pixel array 24 is formed by arranging a plurality of pixels in the form of a lattice. In FIG. 3, pixels other than a pixel 24P are not shown. In the pixel array 24, the pixels arranged in the vertical direction sequentially output a pixel signal according to a control signal supplied from the vertical scanning circuit 23.

The PLL 25 generates a clock signal of a predetermined frequency necessary to drive each of the blocks within the CMOS sensor 21 on the basis of an externally supplied clock signal (CK). The PLL 25 then supplies the generated clock signal to the reference voltage circuit 26 and the column ADC 27.

The reference voltage circuit 26 generates a ramp signal R whose voltage drops from a predetermined initial voltage with a fixed slope. The reference voltage circuit 26 then supplies the ramp signal R to the column ADC 27.

The column ADC 27 includes a comparator 31, a counter 32, and a bus 33. Incidentally, in the column ADC 27, a plurality of combinations of comparators 31 and counters 32 are arranged in a horizontal direction in such a manner as to correspond to the number of pixels arranged in the horizontal direction of the pixel array 24. However, FIG. 3 shows one set of the comparator 31 and the counter 32.

One input terminal of the comparator 31 is supplied with a pixel signal P from the pixel 24P in the pixel array 24, while another input terminal of the comparator 31 is supplied with the ramp signal R from the reference voltage circuit 26. The comparator 31 compares the pixel signal P with the ramp signal R, and supplies a comparison result signal obtained as a result of the comparison to the counter 32.

The counter 32 is supplied with a counter clock signal (CKX) of a predetermined frequency from the PLL 25. The counter 32 counts the counter clock signal according to the comparison result signal supplied from the comparator 31 and control of the system controlling unit 22. The counter 32 thereby converts the analog pixel signal P output by the pixel 24P into digital pixel data, and then outputs the digital pixel data. The counter 32 in FIG. 3 includes a latch and 13 TFFs (Toggle Flip-Flops), and outputs 13-bit pixel data.

The bus 33 is a 13-bit bus for connecting the counter 32 with the sense amplifier 29.

The horizontal scanning circuit 28 sequentially supplies a signal to output pixel data to a plurality of counters 32 arranged in the horizontal direction of the column ADC 27 in predetermined timing according to control of the system controlling unit 22.

The sense amplifier 29 converts the pixel data supplied in parallel from the column ADC 27 via the bus 33 into serial pixel data. The sense amplifier 29 then outputs the serial pixel data to the outside.

An operation of the CMOS sensor 21 will next be described with reference to FIG. 4.

Figure 4:
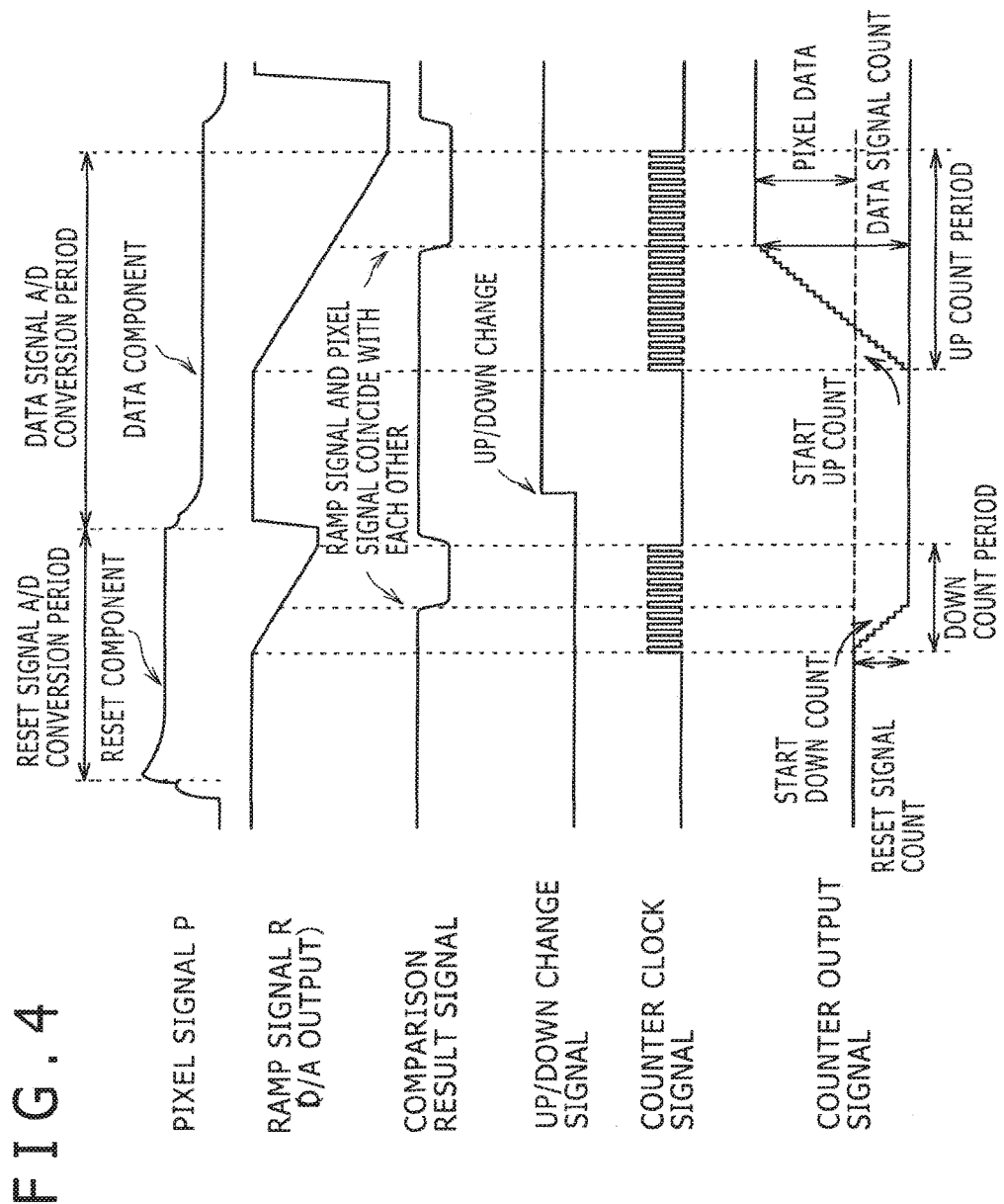
FIG. 4 is a diagram of operation of the CMOS sensor.

FIG. 4 shows, from a top in order, the pixel signal P output by the pixel in the pixel array 24, the ramp signal R output by the reference voltage circuit 26, the comparison result signal output by the comparator 31, a signal for changing to counting up or counting down by the counter 32, the counter clock signal output by the PLL 25, and a counter output signal output by the counter 32.

As shown in a first chart from the top of FIG. 4, according to a control signal supplied from the vertical scanning circuit 23, the pixel in the pixel array 24 outputs the pixel signal P (a reset component) corresponding to a predetermined reference potential during a reset signal A/D conversion period, and outputs the pixel signal P (a data component) according to a charge corresponding to an amount of light received by a photodetector not shown in the figure during a data signal A/D conversion period.

As shown in a second chart from the top of FIG. 4, the reference voltage circuit 26 outputs the ramp signal R whose voltage drops with a fixed slope from a predetermined initial voltage. In the ramp signal R, a period during which the voltage corresponding to the data signal A/D conversion period drops is longer than a period during which the voltage corresponding to the reset signal A/D conversion period drops.

As shown in a third chart from the top of FIG. 4, the comparator 31 compares the pixel signal P with the ramp signal R, and outputs a comparison result signal at an H-level when the pixel signal P exceeds the ramp signal R, and outputs a comparison result signal at an L-level when the pixel signal P is below the ramp signal R. That is, in the case where the voltage of the ramp signal R drops with a fixed slope, the comparator 31 outputs the comparison result signal that makes a transition from the H-level to the L-level when the ramp signal R coincides with the pixel signal P.

As shown in a fourth chart from the top of FIG. 4, the counter 32 is supplied with a signal for changing to counting up or counting down from the system controlling unit 22, the signal being at an L-level while the voltage of the ramp signal R drops with a fixed slope during the reset signal A/D conversion period, and the signal being at an H-level while the voltage of the ramp signal R drops with a fixed slope during the data signal A/D conversion period.

The PLL 25 supplies the counter 32 with the counter clock signal of a predetermined frequency as shown in a fifth chart from the top of FIG. 4, for example a high-speed clock signal of 500 MHz.

As shown in a sixth chart from the top (at a bottom) of FIG. 4, the counter 32 counts the counter clock signal, and outputs pixel data.

Specifically, when the signal for changing to counting up or counting down is at the L-level, the counter 32 is in a counting-down mode, in which mode the counter 32 starts counting down at a time at which the voltage of the ramp signal R starts dropping during the reset signal A/D conversion period and then retains a count value (reset signal count) counted until a time when the comparison result signal makes a transition from the H-level to the L-level. Thereafter, the signal for changing to counting up or counting down makes a transition from the L-level to the H-level, and the counter 32 is set in a counting-up mode, in which mode the counter 32 starts counting up at a time at which the voltage of the ramp signal R starts dropping during the data signal A/D conversion period. The counter 32 then outputs, as pixel data, a count value of a difference between a count value (data signal count) counted until a time when the comparison result signal makes a transition from the H-level to the L-level and the reset signal count.

The CMOS sensor 21 will next be further described with reference to FIG. 5.

Figure 5:
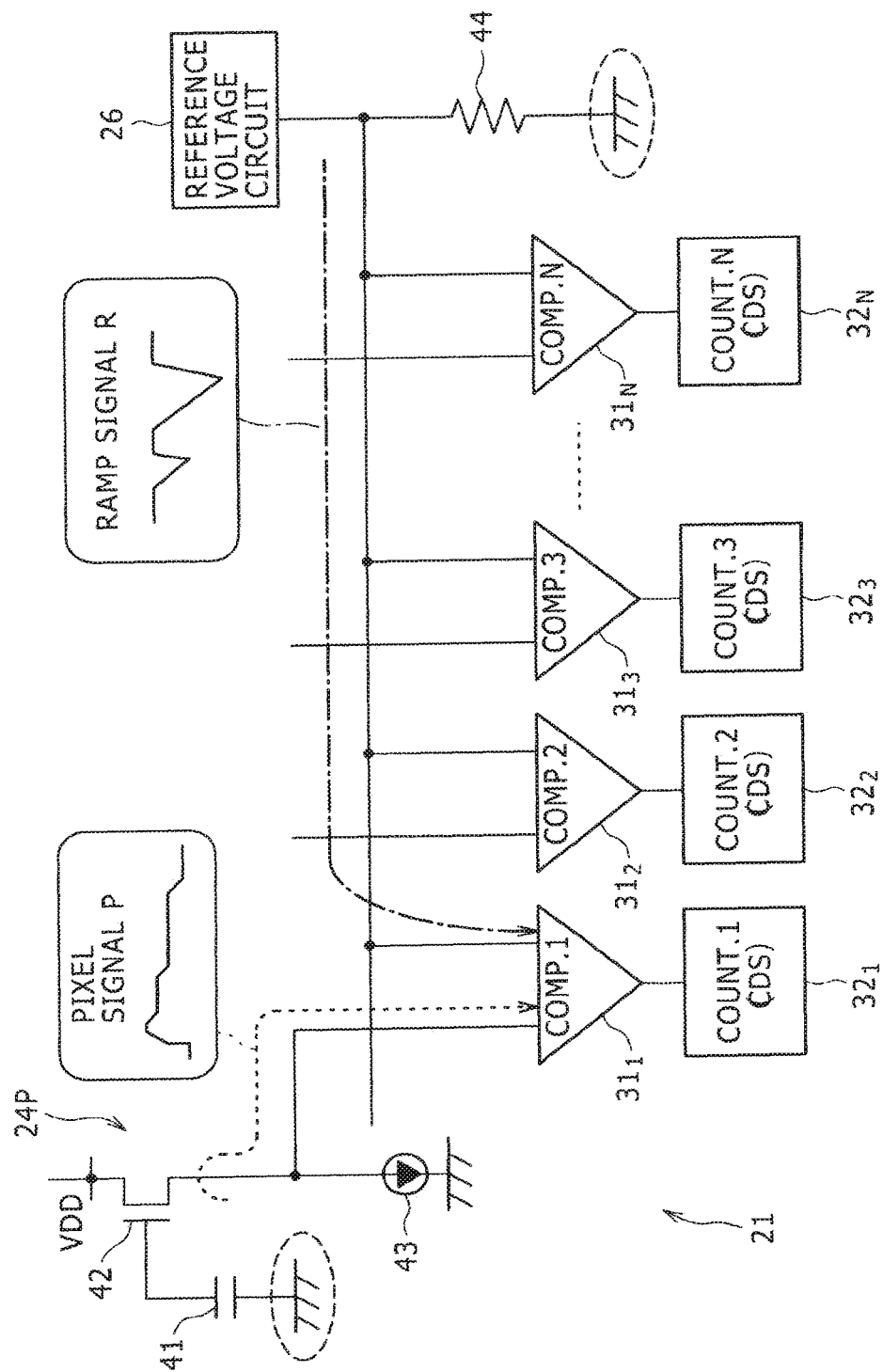
FIG. 5 is a circuit diagram showing an example of configuration of the CMOS sensor.

The CMOS sensor 21 in FIG. 5 includes the reference voltage circuit 26, N comparators 31.sub.1 to 31.sub.N, N counters 32.sub.1 to 32.sub.N, an FD 41, a transistor 42, a current source 43, and a resistance 44.

The FD 41 and the transistor 42 are a part of constituent elements of the pixel 24P in the pixel array 24 in FIG. 3. A charge output according to an amount of light received by a photodiode not shown in the figure is transferred to and accumulated in the FD 41 according to control of the vertical scanning circuit 23. The transistor 42 amplifies a charge accumulated in the FD 41, and outputs a pixel signal P according to control of the vertical scanning circuit 23.

One terminal of the FD 41 is grounded, and another terminal of the FD 41 is connected to the gate of the transistor 42. The source of the transistor 42 is connected to a power supply voltage VDD, while the drain of the transistor 42 is grounded via the current source 43 and is connected to one input terminal of the comparator 31.sub.1. The output terminal of the reference voltage circuit 26 is connected to another input terminal of the comparator 31.sub.1, and is grounded via the resistance 44.

In the thus formed CMOS sensor 21, the reference potential of the pixel signal P input to the comparator 31 is a GND level because the FD 41 in which the charge output according to the amount of light received by the photodiode not shown in the figure is accumulated is grounded. The reference potential of the ramp signal R input to the comparator 31 is also a GND level because the output terminal of the reference voltage circuit 26 is grounded via the resistance 44. Thus, noise sources of noises occurring in the pixel signal P and the ramp signal R are a common GND.

Thus, the noises occurring in the pixel signal P and the ramp signal R with the GND as the noise source are in phase with each other as viewed from the comparator 31, and when the comparator 31 compares the pixel signal P and the ramp signal R with each other, the noises occurring in the pixel signal P and the ramp signal R cancel each other out. Therefore, the comparison result signal output by the comparator 31 is not affected by the noises. It is thus possible to suppress the occurrence of noises in the pixel data.

The suppression of the occurrence of noises can be described also from the circuit configuration of the reference voltage circuit 26.

FIG. 6 is a circuit diagram showing an example of configuration of the reference voltage circuit 26.

The reference voltage circuit 26 in FIG. 6 includes a constant-current generating circuit 50, three transistors 51 to 53, a gain changing circuit 54, a transistor 55, a ramp generating circuit 56, and an offset circuit 57.

One terminal of the constant-current generating circuit 50 is grounded, and another terminal of the constant-current generating circuit 50 is connected to the drain of the transistor 51. The source of the transistor 51 is connected to the power supply voltage VDD, and the gate of the transistor 51 is connected to the gate of the transistor 52. A point of connection between the gate of the transistor 51 and the gate of the transistor 52 is connected to a point of connection between the constant-current generating circuit 50 and the drain of the transistor 51, and is also connected to the offset circuit 57.

The source of the transistor 52 is connected to the power supply voltage VDD, and the drain of the transistor 52 is connected to the drain of the transistor 53.

The gate of the transistor 53 is connected to the gain changing circuit 54. A point of connection between the gate of the transistor 53 and the gain changing circuit 54 is connected to a point of connection between the drain of the transistor 52 and the drain of the transistor 53.

Figure 8:
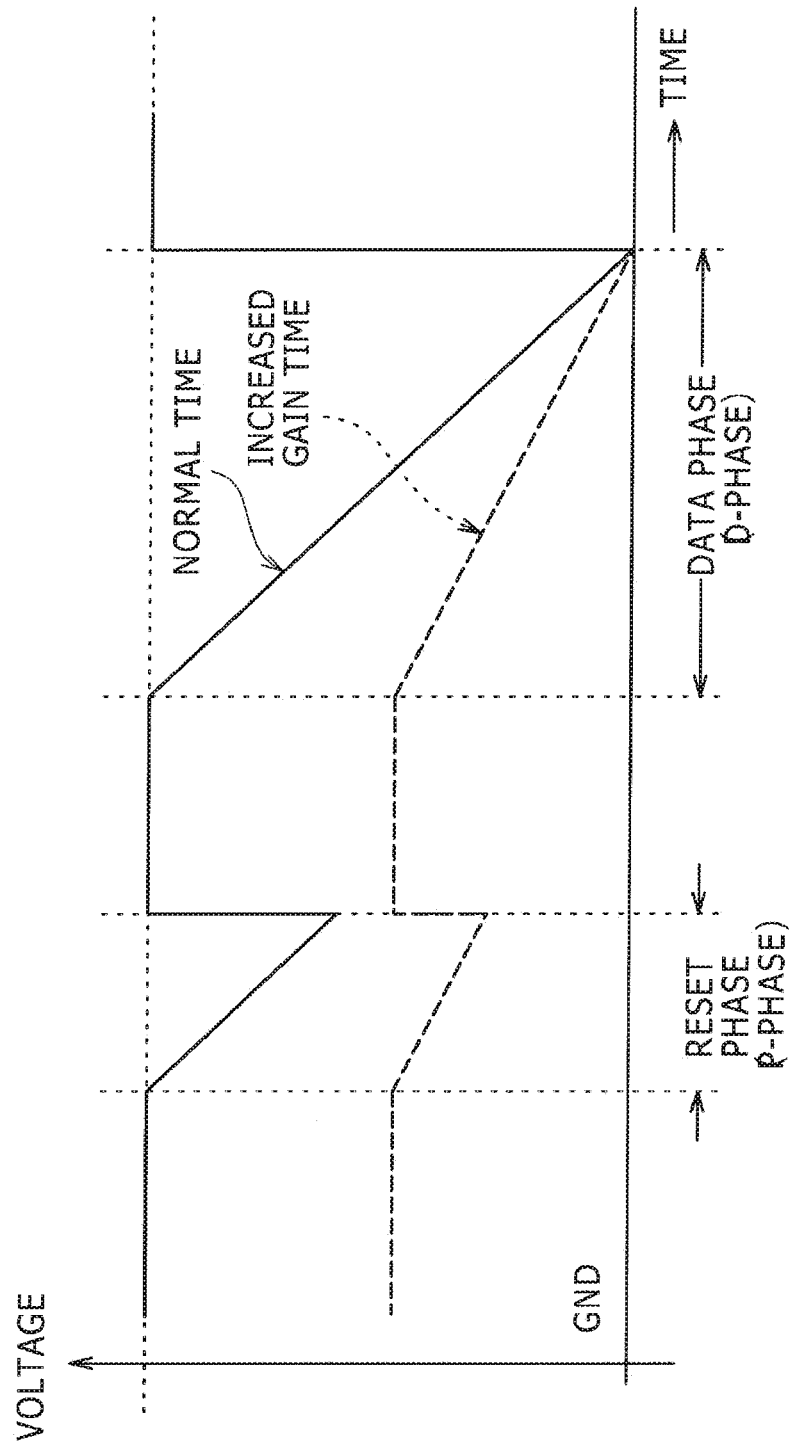
FIG. 8 is a diagram of assistance in explaining a ramp signal at a time of increased gain.

When the gain of an image picked up by the CMOS sensor 21 is changed, or when the gain is increased, for example, the gain changing circuit 54 makes the ramp signal R at a time of gain increase as shown in FIG. 8 to be described later output from the reference voltage circuit 26. The gain changing circuit 54 and the transistor 53 form a current mirror circuit.

The drain of the transistor 55 is connected to the gain changing circuit 54, the source of the transistor 55 is connected to the power supply voltage VDD, and the gate of the transistor 55 is connected to the ramp generating circuit 56. A point of connection between the drain of the transistor 55 and the gain changing circuit 54 is connected to a point of connection between the gate of the transistor 55 and the ramp generating circuit 56.

The ramp generating circuit 56 is a circuit for generating the ramp signal R as shown in FIG. 4.

Figure 9:
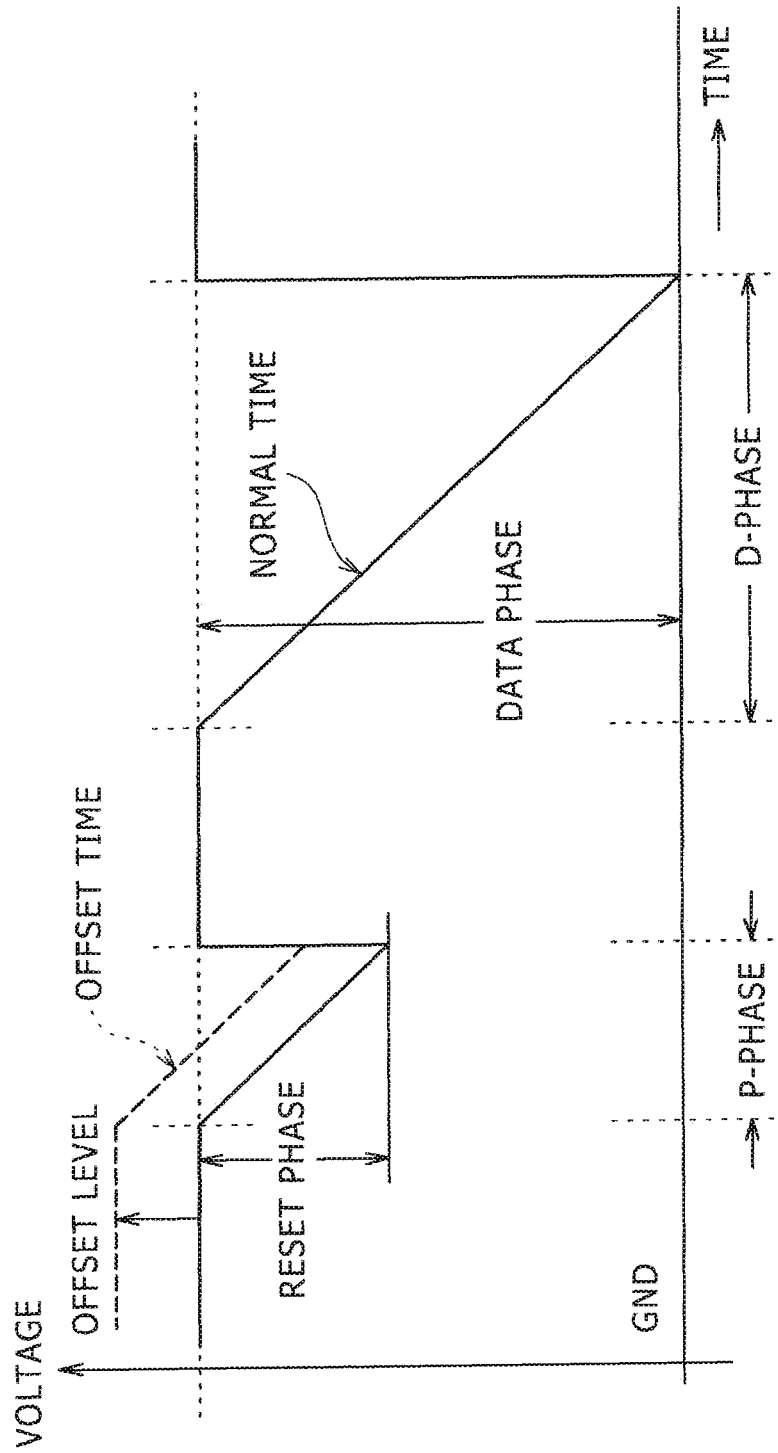
FIG. 9 is a diagram of assistance in explaining a ramp signal at an offset time.

The offset circuit 57 makes the ramp signal R at a time of an offset as shown in FIG. 9 to be described later output from the reference voltage circuit 26 in order to prevent pixel data from being affected by a shift in black reference which shift is caused by a dark current resulting from a change in temperature or the like or a circuit offset component, for example.

Letting In be a current output from the ramp generating circuit 56, If1 be a current output from the offset circuit 57, and Rout be the resistance value of the resistance 44, the ramp signal R output from the thus formed reference voltage circuit 26 is expressed by the following Equation (1).

$$\text{Ramp Signal } R = (Ir1 + If1) \times Rout \qquad (1)$$

As shown in Equation (1), the ramp signal R does not have the term of the power supply voltage VDD. This also shows that noises of the power supply voltage VDD do not affect the pixel data.

Figure 7:
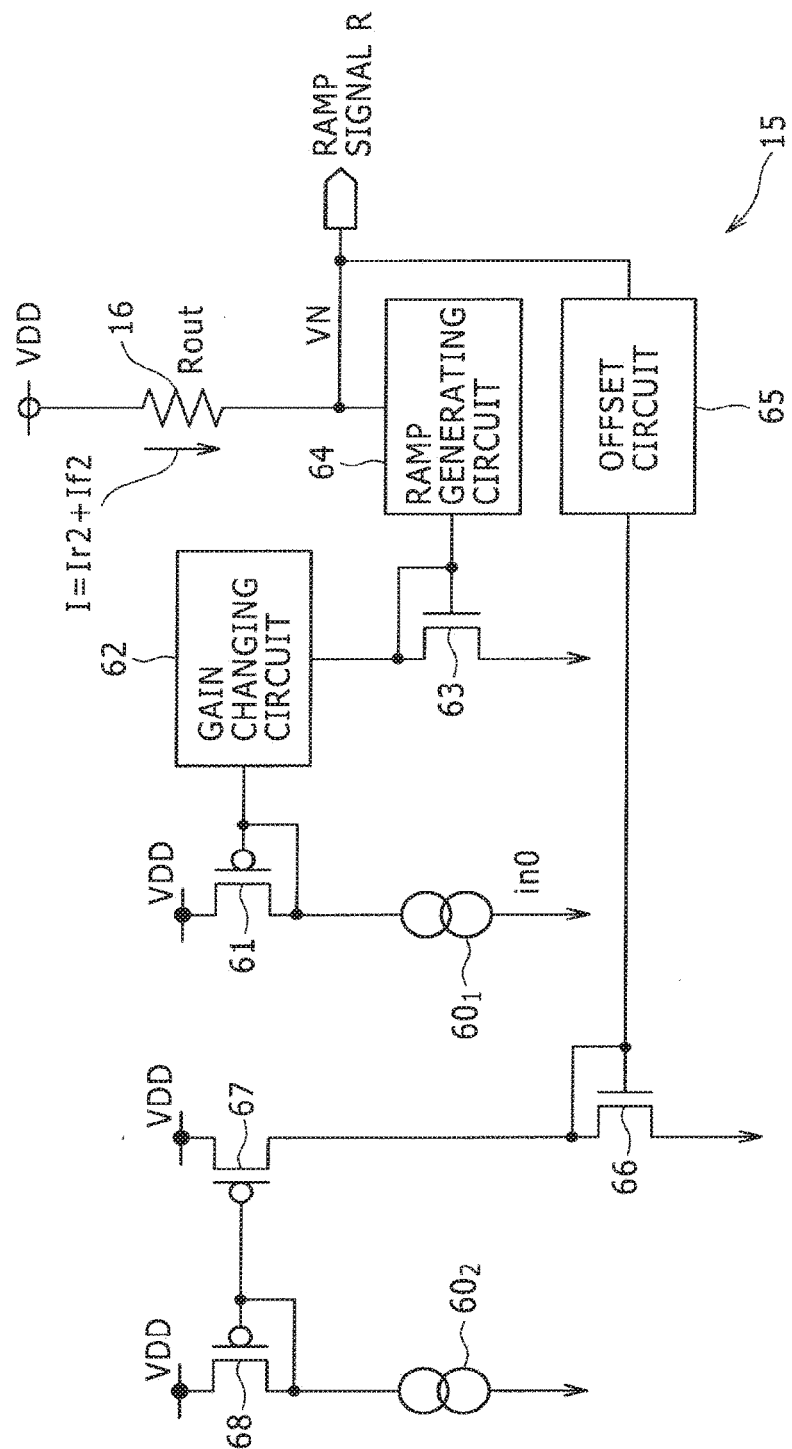
FIG. 7 is a circuit diagram showing the configuration of an example of a reference voltage circuit in the past.

FIG. 7 is a circuit diagram showing a configuration of an example of the reference voltage circuit 15 of the CMOS sensor 11 in the past described with reference to FIG. 1, that is, the CMOS sensor 11 in which the reference potential of the ramp signal R is the power supply voltage VDD.

The reference voltage circuit 15 in FIG. 7 includes two constant-current circuits 60.sub.1 and 60.sub.2, a transistor 61, a gain changing circuit 62, a transistor 63, a ramp generating circuit 64, an offset circuit 65, and transistors 66 to 68.

Letting Ir2 be a current output from the ramp generating circuit 64, If2 be a current output from the offset circuit 65, and Rout be the resistance value of the resistance 16, the ramp signal R output from the thus formed reference voltage circuit 15 is expressed by the following Equation (2).

$$\text{Ramp Signal } R = VDD - (Ir2 + If2) \times Rout \qquad (2)$$

Figure 2:
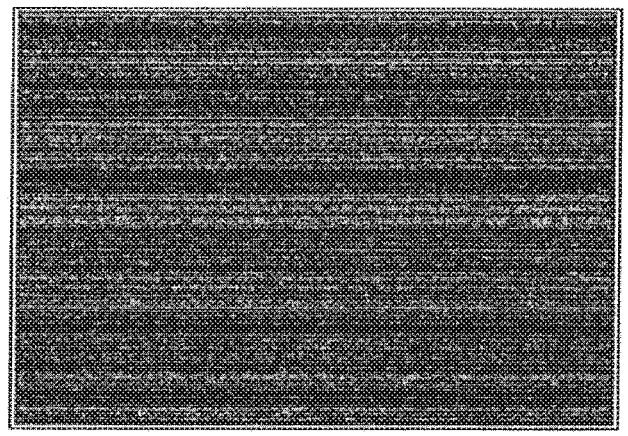
FIG. 2 is a diagram showing an example of laterally drawn noise occurring in an image.

Thus, when the reference potential of the ramp signal R is the power supply voltage VDD, the ramp signal R has the term of the power supply voltage VDD. Therefore, when a noise occurs in the power supply voltage VDD, the noise is superimposed on the ramp signal R, thus affecting the comparison result signal output by the comparator 17 (FIG. 1). As a result, lateral noise as shown in FIG. 2 occurs in an image.

On the other hand, as described above, the reference potential of the ramp signal R output from the reference voltage circuit 26 shown in FIG. 6 is the GND level, so that such lateral noise occurring in an image can be suppressed.

The ramp signal R at a time of gain increase will next be described with reference to FIG. 8.

In FIG. 8, an axis of abscissas indicates the passage of time from a left to a right, and an axis of ordinates indicates the voltage of the ramp signal R. A period during which the voltage of the ramp signal R drops with a fixed slope within the reset signal A/D conversion period described with reference to FIG. 4 will be referred to as a reset phase (P-phase), and a period during which the voltage of the ramp signal R drops with a fixed slope within the data signal A/D conversion period (FIG. 4) will be referred to as a data phase (D-phase).

The ramp signal R at a normal time represents a waveform when the CMOS sensor 21 picks up an image at a normal brightness. The ramp signal R at a time of gain increase represents a waveform when the CMOS sensor 21 picks up an image in a darker condition than normal. That is, in a darker condition than normal, a small amount of charge is accumulated in the FD 41 in FIG. 5. However, decreasing the slope with which the voltage of the ramp signal R drops can lengthen a time before the comparison result signal (FIG. 4) output by the comparator 31 makes a transition from the H-level to the L-level. Thereby the pixel data output by the counter 32 is increased in gain.

A circuit noise occurring in the ramp signal R output from the reference voltage circuit 26 at a time of gain increase will be described in the following.

The reference voltage circuit 26 is formed as shown in FIG. 6, and a voltage noise VN0 given to the ramp signal R by the constant-current generating circuit 50 is expressed by the following Equation (3).

$$VN0 = in0 \times (gm2/gm1) \times (gm4/gm3) \times (gm6/gm5) \times Rout \qquad (3)$$

In Equation (3), in0 is the current noise of the constant-current generating circuit 50, gm1 is the conductance of the transistor 51, gm2 is the conductance of the transistor 52, gm3 is the conductance of the transistor 53, gm4 is the conductance of the gain changing circuit 54, gm5 is the conductance of the transistor 55, gm6 is the conductance of the ramp generating circuit 56, and gm7 is the conductance of the offset circuit 57.

At this time, letting vn1 be the voltage noise of the transistor 51, a voltage noise VN1 given to the ramp signal R by the transistor 51 is expressed by the following Equation (4).

$$VN1 = vn1 \times gm2 \times (gm4/gm3) \times (gm6/gm5) \times Rout \qquad (4)$$

A total noise VN occurring in the ramp signal R is expressed by the following Equation (5).

$$VN^2 = VN0^2 + VN1^2 + VN2^2 + VN3^2 + VN4^2 + VN5^2 + VN6^2 + VN7^2 \qquad (5)$$

In Equation (5), VN2 is a voltage noise given to the ramp signal R by the transistor 52, VN3 is a voltage noise given to the ramp signal R by the transistor 53, VN4 is a voltage noise given to the ramp signal R by the gain changing circuit 54, VN5 is a voltage noise given to the ramp signal R by the transistor 55, VN6 is a voltage noise given to the ramp signal R by the ramp generating circuit 56, and VN7 is a voltage noise given to the ramp signal R by the offset circuit 57.

In this case, for example, when the gain is a maximum, and a return ratio (mirror ratio=gm4/gm3) in the current mirror circuit of the gain changing circuit 54 and the transistor 53 is one, for example, the values of voltage noises VN0 to VN3 appear in the ramp signal R as they are, and thus become noticeable as noise.

In order to suppress an increase in noise at the time of increased gain, the size of the gain changing circuit 54 has to be made sufficiently smaller than the size of the transistor 53. Specifically, as shown in FIG. 8, when the gain is changed to two times, the size of the gain changing circuit 54 is halved, that is, the conductance gm4 of the gain changing circuit 54 is halved, whereby the current produced by the current mirror circuit of the gain changing circuit 54 and the transistor 53 is reduced. In this case, the noises VN0 to VN3 at the time of the increased gain can be suppressed to half of the noises VN0 to VN3 at the time of normal gain.

Incidentally, at a time of low gain, the noises VN0 to VN3 appear in the total noise VN as they are. However, such noises can be reduced by for example increasing the current value of the constant-current generating circuit 50 or performing a band limitation by a capacitance or the like.

The ramp signal R at an offset time will next be described with reference to FIG. 9.

In FIG. 9, an axis of abscissas indicates the passage of time from a left to a right, and an axis of ordinates indicates the voltage of the ramp signal R.

In order to prevent pixel data from being affected by a shift in black reference which shift is caused by a dark current resulting from a change in temperature or the like, a current output by the offset circuit 57 is superimposed on the ramp signal R at the offset time from the ramp generating circuit 56, and the result is output. That is, at the offset time, as shown in FIG. 9, voltage in the reset phase at the offset time is higher than voltage in the reset phase at a normal time, and reference voltage in the reset phase (voltage before dropping with a fixed slope will be referred to as reference voltage) is higher by an offset level than reference voltage in the data phase. The offset level is set according to a change in temperature or the like.

Because the reference voltage in the reset phase is thus higher by the offset level than the reference voltage in the data phase, even when the dark current is increased by a change in temperature or the like, the increase can be cancelled out. Such an offset in the reset phase is performed by the offset circuit 57 outputting a current corresponding to the offset level.

Thus, the offset circuit 57 outputs a current at the offset time, and does not output current at the normal time. Thereby, at the normal time, the voltage noise of voltage output by the offset circuit 57 is prevented from causing a noise in the ramp signal R.

A circuit noise occurring in the ramp signal R output from the reference voltage circuit 26 at an offset time will be described in the following.

As described with reference to FIG. 8, the total noise VN occurring in the ramp signal R is expressed by the above-described Equation (5). The voltage noise given to the ramp signal R by the offset circuit 57 is VN7. When the configuration of current flowing through the offset circuit 57 is that of a system performing current distribution from the gate of the transistor 51 by a current mirror, the voltage noise VN7 given to the ramp signal R by the offset circuit 57 is expressed by the following Equation (6).

$$VN7 = in0 \times (gm7/gm1) \times Rout \quad (6)$$

As described above, in the circuit configuration of the reference voltage circuit 26 shown in FIG. 6, the offset circuit 57 does not output current for an offset at the normal time. Therefore the term of the voltage noise VN7 given to the ramp signal R in Equation (6) can be ignored. The occurrence of noise can thus be suppressed more than in a CMOS sensor in the past having a configuration that adds an offset in the data phase.

Figure 10:
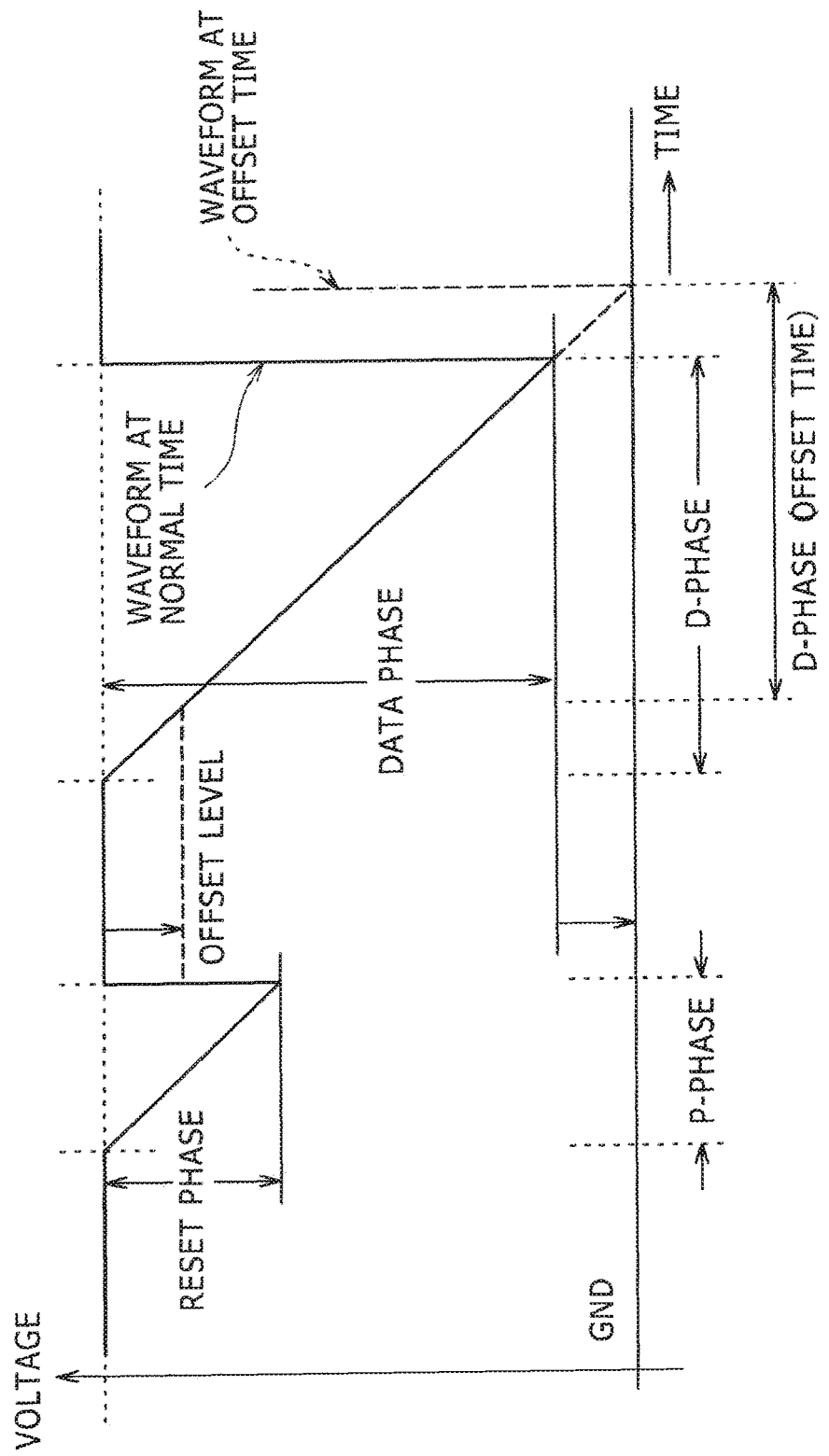
FIG. 10 is a diagram of assistance in explaining a ramp signal at an offset time in the past.

FIG. 10 is a diagram of assistance in explaining the ramp signal R at the offset time in the reference voltage circuit 15 of the CMOS sensor 11 in the past in Patent Document 3, that is, the reference voltage circuit 15 of FIG. 7.

Supposing that a configuration that similarly adds an offset in the data phase is adopted in the present invention having the configuration of FIG. 6, the offset circuit 57 has to output a current, that is, a large amount of current has to be passed through the resistance 44 at the normal time in order to secure an offset level. Then, at the offset time, a configuration is necessary in which by decreasing the current, the reference voltage in the data phase becomes lower.

Thus, in the configuration of FIG. 10, at the normal time, the offset circuit 57 outputs a current, and therefore the voltage noise of the offset circuit 57 affects the ramp signal R.

On the other hand, as described above, in the configuration of FIG. 9, the offset circuit 57 does not output current at the normal time. Therefore the noise occurring in the ramp signal R can be reduced as compared with the configuration in the past of FIG. 10.

In addition, as shown in FIG. 7, the reference voltage circuit 15 has a circuit configuration in which it is necessary to provide the constant-current circuit 60.sub.1 for the gain changing circuit 62 and the constant-current circuit 60.sub.2 for the offset circuit 65 independently of each other. However, the gain changing circuit 54 and the offset circuit 57 in the reference voltage circuit 26 can share the constant-current generating circuit 50. This makes it possible to make the layout area of the reference voltage circuit 26 smaller than that of the reference voltage circuit 15, and in turn reduce the layout area of the CMOS sensor 21. Further, power consumption can be reduced.

Further, for example, a signal processing circuit or the like for eliminating laterally drawn noise caused by difference in reference potential between the pixel signal P and the ramp signal R has been required in the past. However, the CMOS sensor 21 suppresses the noise, thus eliminating the need for such a signal processing circuit. This also makes it possible to reduce the layout area of the CMOS sensor 21 and reduce power consumption.

Incidentally, in the present embodiment, a sensor including unit pixels formed by an NMOS has been described. However, the present invention is applicable to a sensor including unit pixels formed by a PMOS. In this case, polarities in the above description all become opposite. For example, the GND level as a reference is changed to the power supply voltage VDD as a reference. Also in this case, the occurrence of noise can be suppressed by setting the reference potential of the pixel signal P and the reference potential of the ramp signal R at a same level, for example.

The CMOS sensor 21 to which the present invention is applied can be incorporated into devices such as a portable telephone, a compact digital camera, a high-grade single-lens reflex camera, a camcorder, a monitoring camera, a guidance system and the like. These devices can pick up a low-noise image.

It is to be noted that embodiments of the present invention are not limited to the above-described embodiments, and that various changes can be made without departing from the spirit of the present invention.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging device, comprising:
   a pixel including
      a photodetector configured to receive incident light and output an amount of charge,
      a floating diffusion configured to receive the amount of charge, and
      an amplifying transistor coupled to the floating diffusion and configured to output a pixel signal corresponding to the amount of charge;
   a signal line configured to convey the pixel signal;

a current source circuit coupled to the signal line;

a reference signal generation circuit configured to generate a reference signal; and a comparator including a first input and a second input, the comparator being configured to compare the pixel signal and the reference signal, wherein the current source circuit is configured to electrically connect a common ground voltage to the first input, and the reference signal generation circuit is configured to electrically connect the common ground voltage to the second input.

2. The imaging device according to claim 1, wherein the floating diffusion and the amplifying transistor are coupled to the common ground voltage.

3. The imaging device according to claim 1, wherein the reference voltage generation circuit includes a resistance and a reference voltage circuit.

4. The imaging device according to claim 1, wherein a reference potential of the current source circuit and a reference potential of the reference signal generation circuit are at a common ground level.

5. The imaging device according to claim 1, wherein the reference signal is a ramp signal.

6. The imaging device according to claim 1, wherein the reference signal is a ramp signal whose voltage changes from a predetermined potential.

7. An imaging device comprising:

a pixel including
   a photodetector configured to receive incident light and output an amount of charge,
   a floating diffusion configured to receive the amount of charge, and
   an amplifying transistor coupled to the floating diffusion and configured to output a pixel signal corresponding to the amount of charge;

a signal line configured to convey the pixel signal;

a current source circuit coupled to the signal line;

a reference signal generation circuit configured to generate a reference signal; and a comparator including a first input and a second input, the comparator being configured to compare the pixel signal and the reference signal, wherein the first input is electrically connected to the current source circuit, the current source circuit is configured to receive a common ground voltage, the second input is electrically connected to the reference signal generation circuit, and the reference signal generation circuit is configured to receive the common ground voltage.

8. The imaging device according to claim 7, wherein the floating diffusion and the amplifying transistor are coupled to the common ground voltage.

9. The imaging device according to claim 7, wherein the reference voltage generation circuit includes a resistance and a reference voltage circuit.

10. The imaging device according to claim 7, wherein a reference potential of the current source circuit and a reference potential of the reference signal generation circuit are at a common ground level.

11. The imaging device according to claim 7, wherein the reference signal is a ramp signal.

12. The imaging device according to claim 7, wherein the reference signal is a ramp signal whose voltage changes from a predetermined potential.

13. An imaging device, comprising:

a pixel including
   a photodetector configured to receive incident light and output an amount of charge,
   a floating diffusion configured to receive the amount of charge, and
   an amplifying transistor coupled to the floating diffusion and configured to output a pixel signal corresponding to the amount of charge;

a signal line configured to convey the pixel signal;

a current source circuit coupled to the signal line;

a reference signal generation circuit configured to generate a reference signal; and a comparator including a first input configured to receive the pixel signal and a second input configured to receive the reference signal, wherein the first input is coupled to the current source circuit, the current source circuit is configured to receive a common ground voltage, the second input is coupled to the reference signal generation circuit, and the reference signal generation circuit is configured to receive the common ground voltage.

14. The imaging device according to claim 13, wherein the floating diffusion and the amplifying transistor are coupled to the common ground voltage.

15. The imaging device according to claim 13, wherein the reference voltage generation circuit includes a resistance and a reference voltage circuit.

16. The imaging device according to claim 13, wherein a reference potential of the current source circuit and a reference potential of the reference signal generation circuit are at a common ground level.

17. The imaging device according to claim 13, wherein the reference signal is a ramp signal.

18. The imaging device according to claim 13, wherein the reference signal is a ramp signal whose voltage changes from a predetermined potential.

\* \* \* \* \*